US009130843B2

United States Patent
Akhtar et al.

(10) Patent No.: US 9,130,843 B2
(45) Date of Patent: Sep. 8, 2015

(54) METHOD AND APPARATUS FOR IMPROVING HTTP ADAPTIVE STREAMING PERFORMANCE USING TCP MODIFICATIONS AT CONTENT SOURCE

(75) Inventors: Shahid Akhtar, Richardson, TX (US); Viorel Craciun, Ottawa (CA); Pieter Liefooghe, Durham, NC (US); Ather Chaudhry, Richardson, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 524 days.

(21) Appl. No.: 13/475,236

(22) Filed: May 18, 2012

(65) Prior Publication Data

US 2013/0308454 A1    Nov. 21, 2013

(51) Int. Cl.
*H04L 12/26* (2006.01)
*H04L 29/06* (2006.01)
*H04L 29/08* (2006.01)

(52) U.S. Cl.
CPC .......... *H04L 43/0864* (2013.01); *H04L 65/608* (2013.01); *H04L 65/80* (2013.01); *H04L 67/02* (2013.01); *H04L 69/16* (2013.01); *H04L 69/163* (2013.01)

(58) Field of Classification Search
CPC . H04L 65/4076; H04L 65/602; H04L 65/607; H04L 65/608; H04L 43/0852; H04L 47/193; H04L 47/10; H04N 21/85406; H04N 21/6581; H04N 21/8455; H04N 21/8456; H04N 21/266; G06Q 30/02; G06Q 30/0277; G06Q 30/0252; H04J 3/0685
See application file for complete search history.

(56) References Cited

U.S. PATENT DOCUMENTS

| | | | |
|---|---|---|---|
| 6,134,690 A * | 10/2000 | Ivaturi et al. | 714/736 |
| 7,296,206 B2 * | 11/2007 | Miyake et al. | 714/748 |
| 8,159,943 B2 * | 4/2012 | Garcia et al. | 370/231 |
| 2005/0013246 A1 * | 1/2005 | Miyake et al. | 370/230 |
| 2005/0195810 A1 * | 9/2005 | Sung et al. | 370/389 |
| 2005/0243849 A1 * | 11/2005 | Wentink | 370/412 |
| 2006/0050640 A1 * | 3/2006 | Jin et al. | 370/235 |
| 2006/0104313 A1 * | 5/2006 | Haner et al. | 370/517 |
| 2007/0195797 A1 * | 8/2007 | Patel et al. | 370/400 |

(Continued)

OTHER PUBLICATIONS

Mehrotra et al., "Hybrid Window and Rate Based Congestion Control for Delay Sensitive Applications," IEEE, 2010: full text paper was peer reviewed at the direction of the IEEE Communications Society subject matter experts for publication in the IEEE Globecom 2010 proceedings.

*Primary Examiner* — Charles C Jiang
*Assistant Examiner* — Thad Defauw
(74) *Attorney, Agent, or Firm* — Harness, Dickey & Pierce, P.L.C.

(57) ABSTRACT

A method of sending hypertext transfer protocol (HTTP) adaptive streaming (HAS) content from a content source to a client over a transmission control protocol (TCP) connection between the content source and the client may include receiving a request for one or more first HAS data chunks from the client; sending the one or more first HAS data chunks to the client; generating idle delay values indicating an amount of delay in the TCP connection during an idle time period, the idle time period being a time period over which no HAS data chunks are being sent from the content source to the client; receiving a request for a second HAS data chunk from the client; setting the size of a starting TCP congestion window based on the idle delay values; and sending the second HAS chunk to the client using the starting TCP congestion window.

20 Claims, 6 Drawing Sheets

(56) References Cited

U.S. PATENT DOCUMENTS

| | | | |
|---|---|---|---|
| 2007/0280245 A1* | 12/2007 | Rosberg | 370/392 |
| 2008/0034416 A1* | 2/2008 | Kumar et al. | 726/15 |
| 2008/0112331 A1* | 5/2008 | Long et al. | 370/245 |
| 2008/0170501 A1* | 7/2008 | Patel et al. | 370/235 |
| 2010/0205049 A1* | 8/2010 | Long et al. | 705/14.5 |
| 2011/0307581 A1* | 12/2011 | Furbeck et al. | 709/219 |
| 2012/0002547 A1* | 1/2012 | Picard | 370/235 |
| 2012/0120802 A1* | 5/2012 | Mach et al. | 370/235 |
| 2012/0131184 A1* | 5/2012 | Luna et al. | 709/224 |
| 2012/0144445 A1* | 6/2012 | Bonta et al. | 725/116 |
| 2012/0198031 A1* | 8/2012 | Bouazizi | 709/219 |
| 2012/0213069 A1* | 8/2012 | Oguchi | 370/231 |
| 2012/0263063 A1* | 10/2012 | Catrein et al. | 370/252 |
| 2012/0290709 A1* | 11/2012 | Roberts et al. | 709/224 |
| 2012/0317303 A1* | 12/2012 | Wang | 709/231 |
| 2013/0227102 A1* | 8/2013 | Beck et al. | 709/223 |
| 2014/0196037 A1* | 7/2014 | Gopalan | 718/1 |

* cited by examiner

METHOD AND APPARATUS FOR IMPROVING HTTP ADAPTIVE STREAMING PERFORMANCE USING TCP MODIFICATIONS AT CONTENT SOURCE

BACKGROUND

1. Field

Example embodiments relate generally to flow control in communications networks.

2. Description of Related Art

HTTP adaptive streaming (HAS) is emerging as a popular approach to streaming video on demand and real-time content to devices of clients including hand held media devices, laptops, PCs, cell phones, and internet-capable TVs. HAS is adaptive in the sense that the quality of the video can be adjusted based on the bandwidth or data rate available between the server and the client. However, each client individually adapts its video quality independent of other video users sharing the same resources. The link by which HAS content is transmitted between a content source and a client may be regulated by the transmission control protocol (TCP).

TCP constitutes the transport layer of the TCP/internet protocol (IP) suite. In general TCP is responsible for ensuring the reliable delivery of data from host to host which includes handling congestion control by altering an amount of data being sent from a sender when network congestion is detected.

The bandwidth usage of HAS is affected by the congestion control techniques utilized by TCP, which may vary between different implementations of TCP. HAS performance may be evaluated based on how efficiently HAS uses available bandwidth. Accordingly, when considering the performance of HAS, it may be useful to evaluate the effects particular implementations of TCP have on the bandwidth usage of HAS.

SUMMARY

Example embodiments are directed to a method and apparatus for implementing modifications to TCP which improve HTTP adaptive streaming (HAS) at a content source.

According to at least one example embodiment, a method of sending hypertext transfer protocol (HTTP) adaptive streaming (HAS) content from a content source to a client over a transmission control protocol (TCP) connection between the content source and the client may include measuring network delay values of the TCP connection; and determining a size of a starting TCP congestion window (cwnd) based on the measured delay values.

The method may further include receiving a request for one or more first HAS data chunks from the client; sending the one or more first HAS data chunks to the client; receiving a request for a second HAS data chunk from the client; and sending the second HAS chunk to the client using the determined cwnd. The network delay values may include idle delay values indicating an amount of delay in the TCP connection during an idle time period, the idle time period is a time period over which no HAS data chunks are being sent from the content source to the client, and the starting cwnd may be determined based on the idle delay values.

Generating the idle delay values may include generating one or more loopback messages and sending the one or more loop back messages to the HAS client during the idle time period; measuring a plurality of first round trip times (RTTs) corresponding to each of the one or more loop back messages, respectively; and generating the idle delay values based on the measured plurality of RTTs.

The idle delay values may include a short term idle delay value, and generating the short term idle delay value may include averaging RTTs falling in a first moving window of the plurality of first RTTs.

The idle delay values may further include a long term delay value, and generating the long term idle delay value may include averaging RTTs falling in a second moving window of the plurality of first RTTs, the first moving window including fewer RTT values than the second moving window.

The method may further include generating an active delay value indicating an amount of delay in the TCP connection during an active time period, the active time period being a time period during which one or more HAS data chunks are being sent. Setting the size of the starting TCP congestion window may include setting the size of a starting TCP congestion window based on the idle delay values and the active delay value.

Sending the one or more first HAS data chunks may include dividing the first one or more data chunks into a plurality of data segments, and sending each of the plurality of data segments to the client.

Generating the active delay value may include measuring a plurality of second round trip times (RTTs) corresponding to each of the plurality of data segments, respectively, and generating the active delay values based on the measured plurality of second RTTs.

Generating the active delay values based on the measured second RTTs may include averaging RTTs falling in a moving window of the plurality of second RTTs.

The method may further include storing the n longest successful RTTs from among the first plurality of RTTs and the second plurality of RTTs, successful RTTs being RTTs of data segments or loopback messages for which the content source received no indication of loss; and determining a lossless delay value based on an average of the n longest successful RTTs. Setting the size of the starting TCP congestion window may include setting the size of a starting TCP congestion window based on the idle delay values, the active delay value, and the lossless delay value.

The method may further include determining a fraction value based on the idle delay values, the active delay value, and the lossless delay value; and determining whether the fraction value is greater than a reference value. Setting the size of the starting TCP congestion window may include determining a product of the fraction value and a size of a last TCP congestion window used to send the one or more first HAS chunks to the client, and setting the determined product as the size of the starting TCP congestion window.

The one or more loopback messages may be empty MP4 HAS messages.

According to at least one example embodiment, a network apparatus configured to send hypertext transfer protocol (HTTP) adaptive streaming (HAS) content to a client over a transmission control protocol (TCP) connection between the network apparatus and the client may include a receiver unit configured to receive data; a transmitting unit configured to transmit data; a memory unit configured to store parameters corresponding with characteristics of the TCP connection; and a processing unit coupled to the transmitting unit, the receiving unit, and the memory unit and configured to control operations associated with sending HAS content to the client. The operations may include measuring network delay values of the TCP connection; and determining a size of a starting TCP congestion window (cwnd) based on the measured delay values.

The processor may be further configured to control operations including receiving a request for one or more first HAS data chunks from the client; sending the one or more first HAS data chunks to the client; receiving a request for a second HAS data chunk from the client; and sending the second HAS chunk to the client using the cwnd. The network delay values may include idle delay values indicating an amount of delay in the TCP connection during an idle time period, the idle time period may be a time period over which no HAS data chunks are being sent from the content source to the client, and the starting cwnd may be determined based on the idle delay values.

The processing unit may be configured such that generating the idle delay values includes generating one or more loopback messages and sending the one or more loop back messages to the HAS client during the idle time period; measuring a plurality of first round trip times (RTTs) corresponding to each of the one or more loop back messages, respectively; and generating the idle delay values based on the measured plurality of first RTTs.

The processor may be configured such that the idle delay values include a short idle delay value, and generating the short idle delay value includes averaging RTTs falling in a first moving window of the plurality of first RTTs.

The processor may be configured such that the idle delay values further include a long idle delay value, and generating the long idle delay value includes averaging RTTs falling in a second moving window of the plurality of first RTTs. The first moving window may include fewer RTT values than the second moving window.

The processor may be further configured to control operations including generating an active delay value indicating an amount of delay in the TCP connection during an active time period, the active time period being a time period during which one or more HAS data chunks are being sent. Setting the size of the starting TCP congestion window may include setting the size of a starting TCP congestion window based on the idle delay values and the active delay value.

The processor may be configured such that sending the one or more first HAS data chunks includes dividing the first one or more data chunks into a plurality of data segments, and sending each of the plurality of data segments to the client. Generating the active delay value may include measuring a plurality of second round trip times (RTTs) corresponding to each of the plurality of data segments, respectively, and generating the active delay values based on the measured plurality of second RTTs.

The processor may be configured such that generating the active delay values based on the measured second RTTs includes averaging RTTs falling in a moving window of the plurality of second RTTs.

The processor may be further configured to control operations including storing the n longest successful RTTs from among the first plurality of RTTs and the second plurality of RTTs, successful RTTs being RTTs of data segments or loopback messages for which the content source received no indication of loss; and determining a lossless delay value based on an average of the n longest successful RTTs. Setting the size of the starting TCP congestion window may include setting the size of a starting TCP congestion window based on the idle delay values, the active delay value, and the lossless delay value.

The processor may be further configured to control operations including determining a fraction value based on the idle delay values, the active delay value, and the lossless delay value; and determining whether the fraction value is greater than a reference value. Setting the size of the starting TCP congestion window may include determining a product of the fraction value and a size of a last TCP congestion window used to send the one or more first HAS chunks to the client and setting the determined product as the size of the starting TCP congestion window, if the fraction value is greater that the reference value, and setting the size of the staring TCP congestion window in accordance with one the TCP standards defined by RFC 2861 and RFC 2581, if the fraction value is not greater that the reference value.

The one or more loopback messages may be empty MP4 HAS messages.

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware in existing communication networks. For example, program modules and functional processes discussed herein may be implemented using existing hardware at existing network elements or control nodes (e.g., a HAS source 305 shown in FIG. 3A). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

HAS Streams and TCP

Widely used variants of the transmission control protocol (TCP), for example TCP Reno, employ two well-known congestion control algorithms called slow start and congestion avoidance. Versions of the congestion control algorithms are described, for example, in Internet Engineering Task Force (IETF) publications including RFC 2861, RFC 2581, and RFC 5681, the contents of each of which are incorporated herein, in their entirety. In general, when a sender is sending data to a receiver, the amount of data that can be sent at a given time is dictated by a congestion window (cwnd), which is an indication of the amount of data that has been sent by the sender and not yet acknowledged by the receiver. The slow start and congestion avoidance algorithms control the size of the cwnd.

In general, for the slow start phase, at the beginning of a transmission of data, the cwnd starts at a value equal to the sender maximum segments size (SMSS) or a multiple thereof (usually 2-3 segments). Then, the congestion window (cwnd) increases based on the number of acknowledgements (ACKs) the sender receives until packet loss is detected. Once packet loss is detected, a slow start threshold (ssthresh) value may be set to half of the cwnd when packet loss was detected, and the cwnd would be reduced by half for each packet loss detected. The cwnd then continues to grow based on the number ACKs received until ssthresh is met. Growth of the cwnd during the slow start phase may be viewed as exponential.

Once ssthresh is met during the slow start phase, the congestion avoidance phase begins. During the congestion avoidance phase, the cwnd is increased in a more linear fashion. For example, the cwnd may be increased by an amount equal to the SMSS for every interval of time equal to the round trip time (RTT) until packet loss is detected again. At this point, the sender may return to the slow start phase or, in accordance with the known fast recovery technique used in TCP Reno, the sender may only reduce the cwnd by half depending on whether or not the packet loss was detected based on the receipt of duplicate ACKs.

HTTP adaptive streaming (HAS) clients generally request data in chunks. Initially, the client will request many chunks to fill the clients' data buffer. Once the clients' data buffer is full, the client will generally request a chunk of data every t seconds, where t is equal to the time length of the media data included in a chunk.

Figure 1:
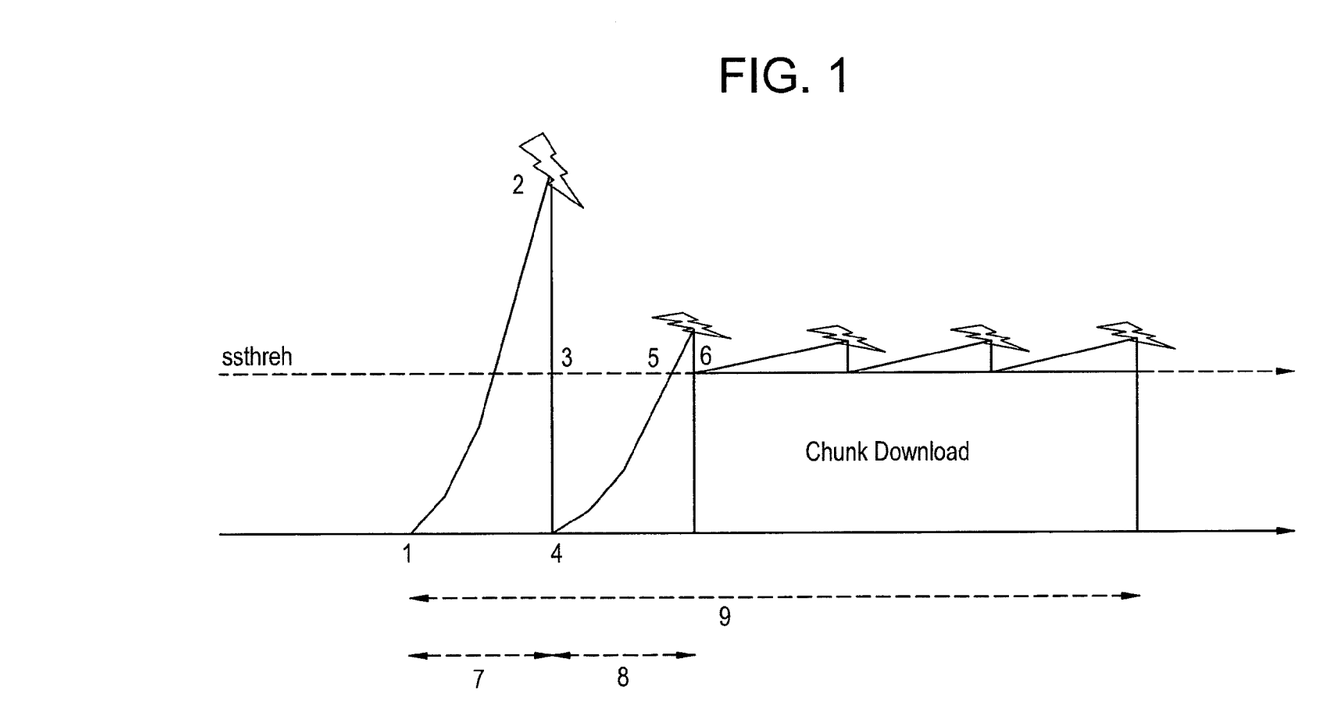
FIG. 1 illustrates an example of a HAS source using TCP to send HAS data.

FIG. 1 illustrates an example of a HAS source using TCP to send HAS data. FIG. 1 illustrates an example in which the client is using a 6 Mb/s DSL line and is experiencing an RTT of 60 ms. At point 1, the slow start phase begins. In the example illustrated in FIG. 1, the cwnd is set to an initial value of 4 segments, and the cwnd grows as the number of ACKs received at the sender increases. During the slow start phase, growth of the cwnd may be exponential. At point 2, packet loss is experienced and the ssthresh is set to half the value of the cwnd at the point the packet loss was experienced, which is 4.2M in the example illustrated in FIG. 1 as indicated by point 3. At point 4, the cwnd is reduced to its initial value due to multiple packet losses, each of which reduces cwnd by half, in the example illustrated in FIG. 1, is 4 segments. At point 5, the cwnd reaches ssthresh and the congestion avoidance phase begins. During the congestion avoidance phase, growth of the cwnd may be linear up to the point where packet loss is experienced. At point 6, when packet loss is experienced during the congestion avoidance phase, the cwnd may be reduced by half. For example, according to the fast recovery technique used by many versions of TCP, when packet loss is detected based on the receipt of 3 duplicate ACKs, the cwnd is reduced by half. When packet loss is detected based on the retransmission timeout (RTO) period expiring, the cwnd is reduced to its initial value. Point 7 indicates the time length of the initial slow start phase which, in this example may be equal to 6 RTT or 360 ms. Point 8 indicates the time length of the second slow start phase which may be equal to 5 RTT or 300 ms. Point 9 indicates the total period of time needed to transmit a chunk of HAS data using TCP, including both the slow start and congestion avoidance phases.

Figure 2:
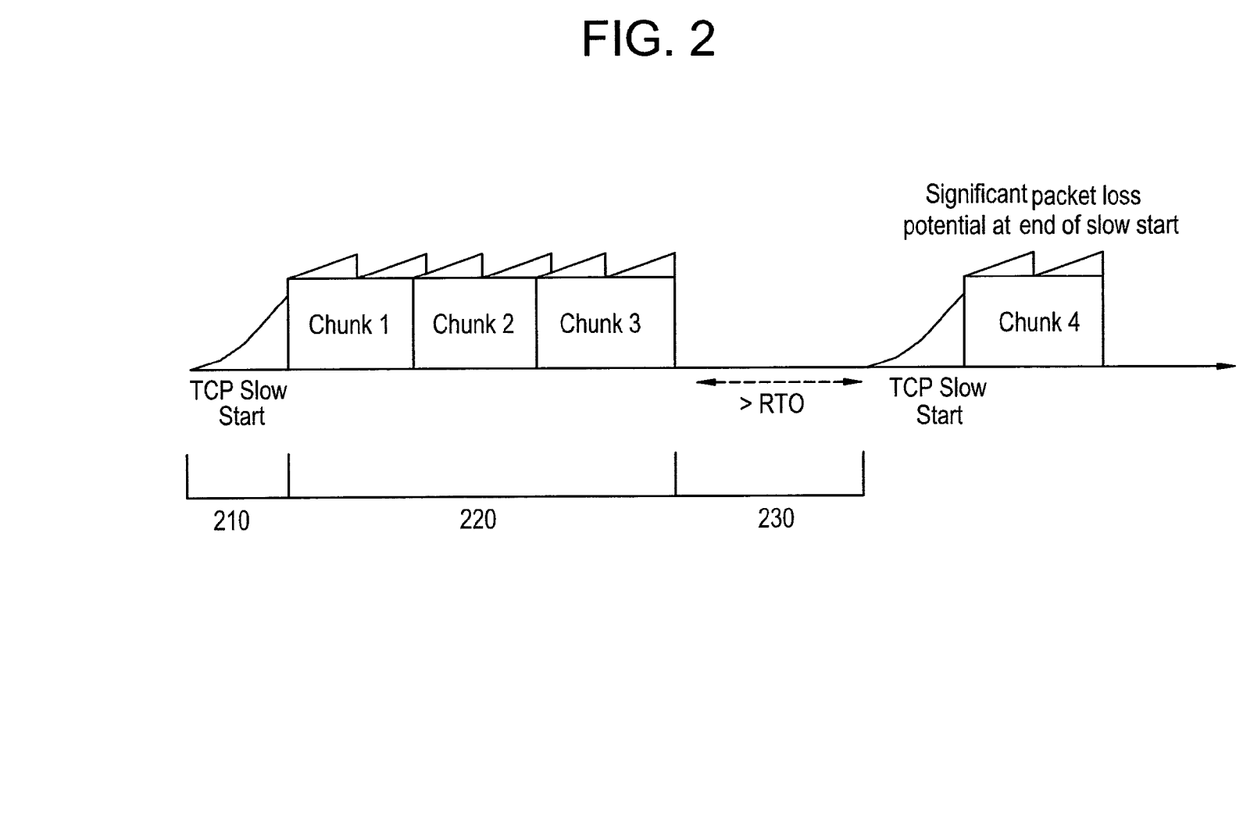
FIG. 2 is a graph of an amount of data being sent from a HAS source to a HAS client over time, where the chunk size of the HAS data is large.

As is discussed above, a HAS client generally requests multiple chunks of data until the client buffer is filled and, afterwards, the HAS client typically requests a chunk of data every interval of time t. For HAS data having large chunk sizes, TCP congestion control can lead to issues which cause lowered throughput for the HAS client. FIG. 2 illustrates issues experienced when TCP is used for large chunks of data.

FIG. 2 is a graph of an amount of data being sent from a HAS source to a HAS client over time, where the chunk size of the HAS data is large, for example, 5-10 seconds. Referring to FIG. 2, period 210 indicates a portion of the slow start phase where the cwnd increases exponentially. Period 220 indicates a portion of the congestion avoidance phase during which 3 chunks of data are sent. Period 230 illustrates the inter chunk time (ICT) which is the time between the end of a chunk and the beginning of a new chunk after the client's buffer has been filled. As is illustrated in FIG. 2, because the chunk size is large, the ICT may exceed retransmission timeout (RTO). Because the ICT exceeds RTO, at the point in time where the 4th chunk is sent, the HAS source may reenter the slow start phase. Further, the ICT may exist after each additional chunk. Accordingly, slow start may be used to send each of a large number of individual chunks after the 4th chunk illustrated in FIG. 2 is sent. This periodic sending of chunks results in a start-stop pattern. During each slow start phase, the HAS source will see reduced throughput during the slow start phase and thus the overall throughput of the HAS stream may be lower.

TCP Variants

As is illustrated in FIGS. 1 and 2, the traditional congestion control techniques, slow start and congestion avoidance, can create a 'saw tooth' pattern for the amount of data sent by the source over time as the cwnd rises and falls multiple times. Many TCP variants have been developed in an attempt to address the saw tooth pattern. These TCP variants include large delay-bandwidth TCP variants and delay based TCP variants. Large delay-bandwidth TCP variants include HSTCP, BIC-TCP, CUBIC-TCP and TCP Hybla. In general, large delay-bandwidth TCP variants increase the cwnd independently of the RTT, because the large delay-bandwidth TCP variants do not necessarily wait for ACKs before increasing the cwnd. This makes large delay-bandwidth TCP variants more aggressive than TCP Reno in general. Though TCP-CUBIC is included in at least one popular operating system, large delay-bandwidth TCP variants are generally not deployed widely due to the tendency of the large delay-bandwidth TCP variants to dominate other TCP variants in terms of the share of available bandwidth used.

Delay based TCP variants use RTT delay to control the size of the cwnd. The delay based TCP variants include TCP Vegas, Compound TCP, and TCP-FAST. Delay based TCP variants may use bandwidth more efficiently than other TCP variants. Compound TCP uses a combination of loss based and delay based components to control the cwnd, and is used by at least one major operating system. However, aside from Compound TCP, delay based TCP variants are less aggressive than TCP Reno and are not widely deployed due to the tendency of many of the delay based TCP variants to be dominated by other TCP variants in terms of the share of available bandwidth used.

Though in general, HAS operates independent of the particular variant of TCP being used by HAS clients, the saw tooth pattern discussed above introduces inefficiencies into HAS. Thus, HAS benefits from the removal of the saw tooth pattern provided, as discussed above, by the large delay-bandwidth TCP variants and delay based TCP variants discussed above. However, the large delay-bandwidth TCP variants and delay based TCP variants discussed above do not fully address the start-stop pattern caused by the periodic reentry into the slow start phase experienced by HAS streams having data with large chunk sizes as is discussed above with reference to FIG. 2.

Addressing the Start-Stop Problem

A number of techniques have been proposed for addressing the start stop pattern discussed above with reference to FIG. 2. One of the techniques is combining TCP session in HTTP sessions. For example, instead of using a separate TCP session for each of a plurality of HTTP sessions associated with a user, the plurality of HTTP sessions could be combined into a smaller number of TCP sessions, for example, a single TCP session. Another technique includes using a very large initial cwnd, for example 10 segments. Though use of the large initial cwnd may result in greater throughput for users using the large initial cwnd, the large initial cwnd raises fairness issues. Specifically, other users on the same network may experience a reduction in bandwidth due to the high amount of bandwidth being consumed by the user with the large initial cwnd. The TCP-fast start (FS) variant uses the same cwnd when the data was sent previously from the same TCP session. However, TCP-FS sets a priority level of the initial packets in the new burst (a cwnd amount of packets) low in order to avoid taking bandwidth from other users currently using bandwidth on the network. However, for HAS, setting an initial priority of the packets to a low priority may result in reduced performance.

In light of the issues discussed above, it is desirable to develop a method of addressing the start stop problem that avoids the reduction of throughput with traditional slow start as well as the lack of fairness associated with the use of a large initial window. A method and apparatus for addressing the start stop issue will now be discussed in greater detail below.

Overview of Method and Apparatus for Providing a TCP Modification to Improve HAS Performance According to at least one example embodiment, the stop start issue discussed above with reference to FIG. 2 is addressed by implementing a version of TCP which includes modifications that allow the use of slow start for each new chunk of HAS data to be avoided. According to at least one example embodiment, for example, at a HAS source, the cwnd used for each new chunk of HAS data may be set to a fraction of a cwnd used at end of the previous chunk or the ssthresh used, instead of using an initial slow start value for the cwnd.

This fraction may be determined based on an estimation of the expected delay in the network. The expected delay may be determined based on delay measurements taken during idle times and times when HAS data chunks are being sent. Thus, according to at least one example embodiment, a TCP modification is provided that, for each new HAS chunk, allows the use of a starting cwnd which is larger than the initial cwnd specified by the traditional slow start algorithm used by, for example TCP Reno, while still limiting the size of the starting cwnd based on the measured expected delay in order to avoid the unfairness associated with a large starting cwnd.

According to at least one example embodiment, the TCP congestion control algorithm modifications for improving HAS at the source may be used with many different TCP variants. For the purpose of simplicity, TCP congestion control algorithm modifications for improving HAS will be described with reference to TCP variants which are based on the TCP definitions provided in the IETF publication RFC 2861 and TCP variants which are based on the TCP definitions provided in the IETF publication RFC 2581.

An example architecture of a network in which the TCP congestion control algorithm modifications for improving HAS may be used will now be discussed with reference to FIG. 3A.

Figure 3A:
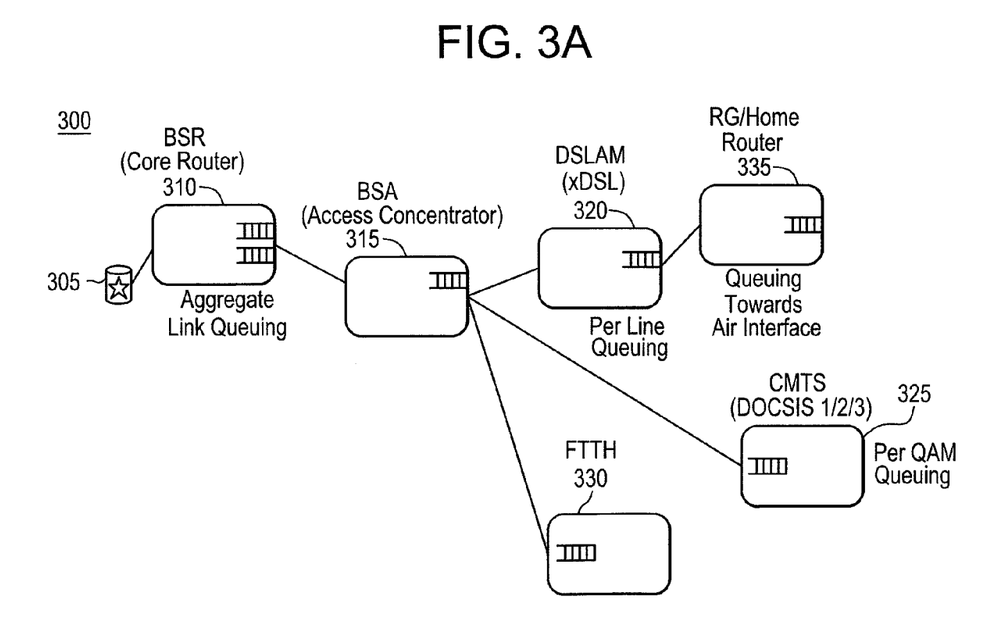
FIG. 3A is a diagram illustrating a portion of communications network 300 according to at least one example embodiment.

FIG. 3A is a diagram illustrating a portion of communications network 300 according to at least one example embodiment. As is illustrated in FIG. 3A, communications network 300 may include a HAS source 305, a broadband services router (BSR) 310, a broad band services aggregator (BSA) 315, digital subscriber line access multiplexer (DSLAM) 320, a cable modem termination system (CMTS) 325, a fiber to the home (FFTH) node 330, and a home router 335. The source 305 may be connected to the BSR 310. The BSR 310 may be connected to the BSA 315. The BSA 315 may be connected to the DSLAM 320, the CMTS 325, and the FTTH node 330. The DSLAM may be connected to a home router 335. Though not illustrated for the purpose of simplicity, each of the CMTS 325 and the FFTH node 330 may be connected to home routers as well. The home routers in the communications network 300 may each be connected to one or more user devices capable of implementing HAS clients and receiving HAS multimedia content including, for example, a PC, tablet, Wi-Fi enabled cell phone or IP enabled TV. The multimedia content may originate at the HAS source 305. The HAS source 305 may be a multimedia server, for example, a video server.

Figure 3B:
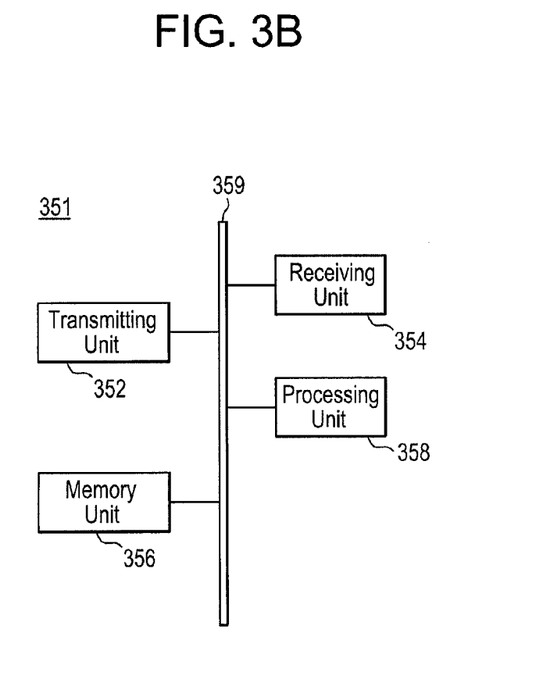
FIG. 3B is a diagram illustrating an example structure of a network element, according to at least one example embodiment.

FIG. 3B is a diagram illustrating an example structure of a network element 351. According to at least one example embodiment, the network element 351 may represent any device which can implement a HAS source or transmit HAS data via a TCP link including, for example, a multimedia server. For example, the HAS source 305 illustrated in FIG. 3A may include the structure described below with reference to the element 351.

Further, according to at least one example embodiment, the network element 351 may be included in a content distribution network (CDN) node. The CDN node may be, for example, a router or other network element capable of caching multimedia data, intercepting content requests en route to a multimedia server, and serving the content requested in the intercepted content request.

Referring to FIG. 3B, the network element 351 may include, for example, a data bus 359, a transmitting unit 352, a receiving unit 354, a memory unit 356, and a processing unit 358.

The transmitting unit 352, receiving unit 354, memory unit 356, and processing unit 358 may send data to and/or receive data from one another using the data bus 359.

The transmitting unit 352 is a device that includes hardware and any necessary software for transmitting signals including, for example, control signals, and media data including video and/or audio data via one or more wired and/or wireless connections to other network elements in communications network 300.

The receiving unit 354 is a device that includes hardware and any necessary software for receiving wireless signals including, for example, control signals, and media data including video and/or audio data via one or more wired and/or wireless connections to other network elements in communications network 300.

The memory unit 356 may be any device capable of storing data including magnetic storage, flash storage, etc.

The processing unit 358 may be any device capable of processing data including, for example, a microprocessor configured to carry out specific operations based on input data, or capable of executing instructions included in computer readable code which may be stored, for example, in the memory unit 356.

For example, the processing unit 358 is capable of performing the functions of a TCP server defined by any known TCP standard including, for example, the standards defined by IETF publications RFC 2861 and RFC 2581. Additionally, the processing unit 358 is capable of performing the calculations necessary to determine delay times when HAS packets are being sent and determine delay times in between the sending of HAS packets. Further, the processing unit 358 is capable of implementing a modified TCP congestion control algorithm which includes estimating an expected delay time based on the delay times when HAS chunks are being sent and the delay times in between HAS chunks, determining a fraction value based on the estimated delay time, and setting a cwnd value based on the determined fraction value.

The TCP congestion control algorithm modifications for improving HAS performance according to at least one example embodiment will now be discussed in greater detail below.

Description of Messages and Parameters Used with TCP Congestion Control Algorithm Modifications for Improving HAS Performance Below is a description of new TCP messages and parameters used in the TCP algorithm modifications for improving HAS performance according to at least one example embodiment. According to at least one example embodiment, the network element 351 is configured to perform functions necessary to generate each of the messages and parameters described below. For example, the processing unit 358 may be configured to perform each of the calculations necessary to generate the parameters discussed below, and the memory unit 356 is capable of storing each of the parameters discussed below. The new TCP messages and parameters will be described below with respect to an example in which a HAS source is sending HAS content to a HAS client.

The HAS_Loopback_message message is a new type of TCP message which may use the same port and session as HAS. Hereinafter, the HAS_Loopback_message may be considered synonymous to, and/or referred to as, the loopback message. The loopback message may be, for example, an empty MP4 HAS message. As will be discussed in greater detail below, the HAS source may send the loopback message to a HAS client periodically during a HAS idle period in order to gauge a delay time during the HAS idle phase.

As used herein, the term HAS idle period describes a period in time in between the point in time when a last HAS chunk was sent by the HAS source and the point in time when a next HAS chunk is sent by the HAS source; and the term HAS active period describes a period of time during which a HAS chunk is being sent.

The HAS_off_filtering value controls the interval of time at which the HAS source sends loopback messages during HAS idle periods. HAS_off_filtering may be set in accordance with the preference of an end user or network operator. For the example, the HAS_off_filtering value may be set close to or the same as an expected average RTT value.

The Max_ICT value defines an amount of time after which it is assumed that a HAS chunk train, a series of consecutive HAS chunks requested by a HAS client and sent by the HAS source, has ended. The Max_ICT value may be set at or close to several times the chunk length of the HAS chunks, for example 4 times a chunk length. For example, if chunks being requested by a HAS client are 10 s in length, the Max_ICT value may be set several times the chunk length, for example, 40 s. The Max_ICT value may be set to this level since, as is discussed above, after the HAS client has filled its data buffer with HAS chunks and a number of the HAS chunks in the data buffer have been viewed, the HAS client may request each new HAS chunk at an interval of time close or equal to the viewing to time of each HAS chunk, which, in the current example, is 10 s. Accordingly, in this example, after 40 s, if no more HAS chunks have been requested, the HAS source may assume that no further HAS chunks will be requested.

The Time_since_last_data_ACK parameter keeps track of the amount of time which has elapsed since the last regular TCP ACK was received. The Time_since_last_data_ACK parameter is initialized to 0 whenever a regular TCP ACK is received, a regular TCP ACK being an ACK for regular TCP data, for example an ACK other than a loopback ACK, which is an ACK sent by a HAS client in response to a loopback message. An example of a regular TCP ACK includes a data ACK, an ACK sent from a HAS client to the HAS source in response to a packet of HAS multimedia data sent from the HAS source to the HAS client.

The Time_since_last_ACK parameter keeps track of an amount of time which has elapsed since the last data ACK or loopback ACK was received, and is initialized to 0 whenever a data ACK or loopback ACK is received, the loopback ACK being an ACK received from a HAS client in response to a loopback message sent to the HAS client from the HAS source.

Table 1 lists definitions of new TCP congestion control parameters which survive the expiration of the RTO and are maintained even during the ICT between sending of a previous HAS chunk and sending of a next HAS chunk. The parameters listed in Table 1 may be used, for example, with RFC 2581-based TCP variants. Whenever TCP variables are updated in accordance with the TCP variant to which the TCP modifications for improving HAS at the source are being applied, the new variables discussed below are updated as well. The parameters listed in Table 1 may be calculated by and stored at the network element 351.

TABLE 1

Cwnd_Cached - a value of cwnd cached when the last HAS chunk was sent.
Ssthresh_Cached - a value of Ssthresh cached when the last HAS chunk was sent.
Srtt_Cached - a value of the smooth round trip time (srtt) cached when the last HAS chunk was sent.
Rttvar_Cached - a value of the round trip time variance (rttvar) cached when the last HAS chunk was sent.

Table 2 lists definitions of new TCP parameters for improving or optimizing a starting value of the cwnd for each new HAS chunk. The parameters listed in Table 2 may be calculated by and stored at the network element 351.

TABLE 2

Delay_during_chunk - a long moving average of the srtt over a HAS active period. The Delay_during_chunk may be an average of many srtt values over multiple HAS active periods. For example, if each HAS chunk of data sent from the HAS source is sent in 20 segments, the Delay_during_chunk may be an exponentially weighted moving average of 60 srtt values each corresponding to HAS active periods so 3 HAS active periods are covered.
Delay_during_idle - a long moving average of the srtt over a HAS idle period. The Delay_during_idle may be an average of many srtt values over multiple HAS idle periods. For example, if a typical ICT is 10 s, and the HAS_off_filtering is set to 200 ms, then 50 loopback messages will be sent during each idle period. In this example, Delay_during_idle may be an exponentially weighted moving average of 150 srtt values each corresponding to HAS idle periods so 3 HAS idle periods are covered.
RD_diff - difference between Delay_during_chunk and Delay_during_idle.
SD_RD_diff - standard deviation of RD_diff.
Worst_delay_without_loss - A moving average of the highest n delay values which do not cause loss, where n may be determined according to the preference of an end user or network operator. The Worst_delay_without_loss will be discussed in greater detail below.
Pre-Chunk_delay - Average delay of a few loopback messages which represents a measurement of network conditions before a HAS chunk TABLE 2-continued starts. The Pre-Chunk_delay may be an average of a few srtt values over less than one HAS idle period. For example, if a typical ICT is 10 s, and the HAS_off_filtering is set to 200 ms, then 50 loopback messages will be sent during a typical idle period. In this example, the Pre-Chunk_delay may be an exponentially weighted moving average of 20 srtt values each corresponding to HAS active periods so less than one HAS idle period is covered.
Chunk_active - Flag set when a HAS chunk is being sent indicating the beginning of a HAS active period, and the end of the HAS idle period.

Figure 4:
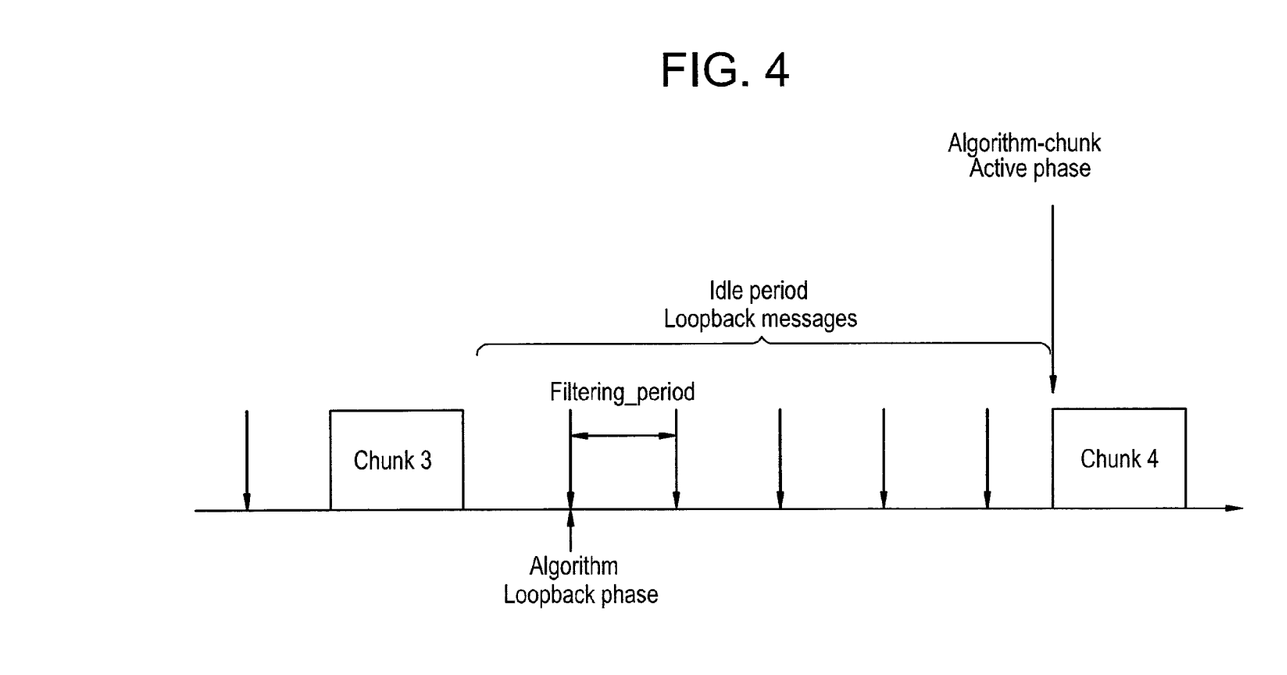
FIG. 4 is a diagram illustrating times when operations of the loopback phase algorithm and the chunk active algorithm take place according to at least one example embodiment.

Description of TCP Congestion Control Algorithm Modifications for Improving HAS Performance According to at least one example embodiment, the TCP congestion control algorithm modifications for improving HAS at the source include two additional algorithms: i) a loopback phase algorithm and ii) an chunk active phase algorithm. FIG. 4 is a diagram illustrating times when operations of the loopback phase algorithm and the chunk active algorithm take place according to at least one example embodiment. The loopback phase algorithm and the chunk active phase algorithm will now be discussed below with reference to FIG. 4.

The loopback phase algorithm defines the TCP modifications during a HAS idle period. The loopback algorithm may be represented by the pseudo code in algorithm 1 below.

Algorithm 1

If time_since_last_ACK > HAS_Off_filtering AND
time_since_last_data_ACK < Max_ICT
    Send HAS_Loopback_message to client
    Set Chunk_active to false
If ACK is received for HAS_Loopback_message
    Update Delay_during_idle
    Update Pre-Chunk_Delay As is shown in algorithm 1, a loopback message is sent and the Chunk_active flag is set to false whenever an amount of time which has passed since receipt of a data ACK or loopback ACK exceeds the HAS_Off_filtering value and an amount of time which has passed since the receipt of a data ACK remains below the MAX_ICT value. The arrows illustrated in FIG. 4 indicate points in time when loopback messages are sent. As is illustrated in FIG. 4, the filtering period, or HAS_Off_filtering value, determines the interval at which loopback messages are sent.

Each time a loopback message is sent by the HAS source to the HAS client, the HAS source may store a sequence number of the sent loopback message. Once a loopback ACK is received from the HAS client, the Delay_during_idle and Pre-Chunk_delay values may be updated by: matching a sequence number of the ACK with a sequence number of the sent loopback message stored at the HAS source, calculating the RTT of the sent loopback message, and incorporating the RTT of loopback message for which the loopback ACK was received into the moving average windows used to calculate the Delay_during_idle and Pre-Chunk_delay values. Further, the HAS source sends another loopback message to the HAS client if the Chunk_active flag is set to true.

The Chunk Active Phase algorithm defines the TCP modifications during a HAS Active period. The Chunk Active phase uses calculations made by the loopback algorithm along with calculations made within the chunk active algorithm to set a starting cwnd for sending a HAS chunk from the HAS source to the HAS client. As is illustrated in FIG. 4, operations of the chunk active phase algorithm begin once the HAS source has TCP data to send. The Chunk Active phase algorithm may be represented by the pseudo code in algorithm 2 below. Algorithm 2 uses the following local variables: Fraction and Delay Diff ---
Algorithm 2
---

```
If TCP data to be sent AND (NOT Chunk_active)
//i.e., HAS_loopback_msg has been sent in the idle period
    Set Chunk_active = true
    Calculate RD_Diff = Delay_during_chunk − Delay_during_idle
    If RD_Diff <0
        Set RD_Diff = 0
    Calculate SD_RD_Diff
    Calculate Delay_diff = Worst_case_delay_without_loss − Pre-
Chunk_delay
    If Delay_diff > RD_Diff + SD_RD_Diff
        Fraction = 1
    Else If Delay_diff < 0
        Fraction = 0
    Else
        Fraction = Delay_diff/(RD_Diff+SD_RD_Diff)
    If Fraction = 0,
        Do regular slow start procedure according to RFC 2581 or 2861
    If Fraction > 0
        If TCP variant is RFC 2581 based
            Set cwnd = cwnd_Cached*Fraction
            Copy ssthresh, srtt and rtt_var from cached values
        If TCP variant RFC 2861 based
            Set cwnd = ssthresh*fraction
If data ACK is received
    Update Delay_during_chunk
//ssthresh, srtt and rtt_var remain as per RFC 2581 recommendations
```

As is shown in algorithm 2, whenever the HAS source has TCP data to send, for example when a request for a chunk of HAS data is received from the HAS client, and the Chunk_active value is set to false, it may be assumed that a loopback message was sent during the idle period since the Chunk_active value is false. Further, the Chunk_active value is set to true, and the RD_Diff value is calculated by subtracting the Delay_during_chunk value from the Delay_during_idle value. If the RD_Diff value is less than 0, the RD_Diff value is set to 0. Additionally, the standard deviation value SD_RD_Diff is calculated based on several RD_Diff values calculated over time. For example, each time the HAS source calculates the RD_diff value, the HAS source may store the RD_Diff value. The HAS source may then calculate the standard deviation of, for example, the last 10 RD_Diff values as the SD_RD_diff value. Though calculation of the SD_RD_diff value is discussed above with reference to an example in which 10 RD-Diff values are used, any number RD-Diff values may be used in determining the SD_RD_diff value, including for example 20, 30 or 50 RD_diff values.

After the SD-RD-diff value is calculated, the local variable Delay_diff may be calculated by subtracting from the Worst_case_delay_without_loss value the Pre-Chunk_delay value. As is discussed above in table 2, the Worst_case_delay_without_loss is an average of the n highest delay values which are not associated with packet loss.

According to at least one example embodiment, the Worst_case_delay_without_loss value may be calculated as follows. Every time a data ACK is received in response to a data segment sent from the HAS source to the HAS client, or a loopback ACK is received in response to a loopback message sent by the HAS source to the HAS client, the HAS source calculates a delay associated with the loopback message or data segment by calculating an RTT of the loopback message or data segment. Each successful delay is compared to the n highest delay values currently stored by the HAS source. The n highest delays may be stored in a high delay buffer at the HAS source. Successful delays are delays which are not associated with a lost packet—as defined below. A successful delay is a delay measured where within one RTO of that measurement no packet loss is detected.

If a newly calculated successful delay is higher than any of the n delays currently stored in the high delay buffer, a lowest one of the n highest delays currently stored in the high delay buffer is removed, and the newly calculated successful delay is added to the high delay buffer. Each delay in the high delay buffer is stored with a value indicating a length of the delay and a value indicating a time point at which the delay was measured. Whenever a packet loss is detected (either by duplicate ACKs or RTO expiry), any one of the n delays stored in the high delay buffer having a time value that is within an RTO of a time at which the lost packet was sent are removed from the high delay buffer. Worst_case_delay_without_loss is an average of the n delays stored in the high delay buffer of the HS source. The value 'n' may be a positive integer chosen based on the preference of an end user of network operator.

If, the local variable Delay_diff is greater that RD_Diff+SD_RD_Diff, the local variable Fraction is set to 1; if Delay_diff is less than 0, Fraction is set to 0; and otherwise, Fraction is set to Delay_diff/(RD_Diff+SD_RD_Diff).

If Fraction is set to 0, the starting cwnd used for sending that HAS chunk waiting to be sent from the HAS source to the HAS client is set according to standard TCP cwnd initialization procedures as defined by IETF publications RFC 2581 or RFC 2861, depending on the TCP variant with which the TCP modification for improving HAS at the source are being used.

If Fraction is greater than 0, for RFC 2861-based TCP variants, the starting cwnd is set to the product of the cached cwnd, which is the cwnd used by the HAS source when the last data segment was sent, and the Fraction value. Further, cached versions of the ssthresh, srtt and rtt_var values, cached by the HAS source when the last data segment was sent, may be used as initial ssthresh, srtt and rtt_var values. For RFC 2581-based TCP variants, if Fraction is greater than 0, the starting cwnd is set to the product of the current ssthresh value and the Fraction value. Further, ssthresh, srtt an rtt_var values may be set as specified by IETF publication RFC 2581.

According to at least one example embodiment, the loopback phase and chunk active phase algorithms may be executed simultaneously. However, according to at least one example embodiment, as is shown in the pseudo code of algorithms 1 and 2 and described above, the actual operations included in algorithms 1 and 2 may be performed during alternating intervals of time.

Figure 5:
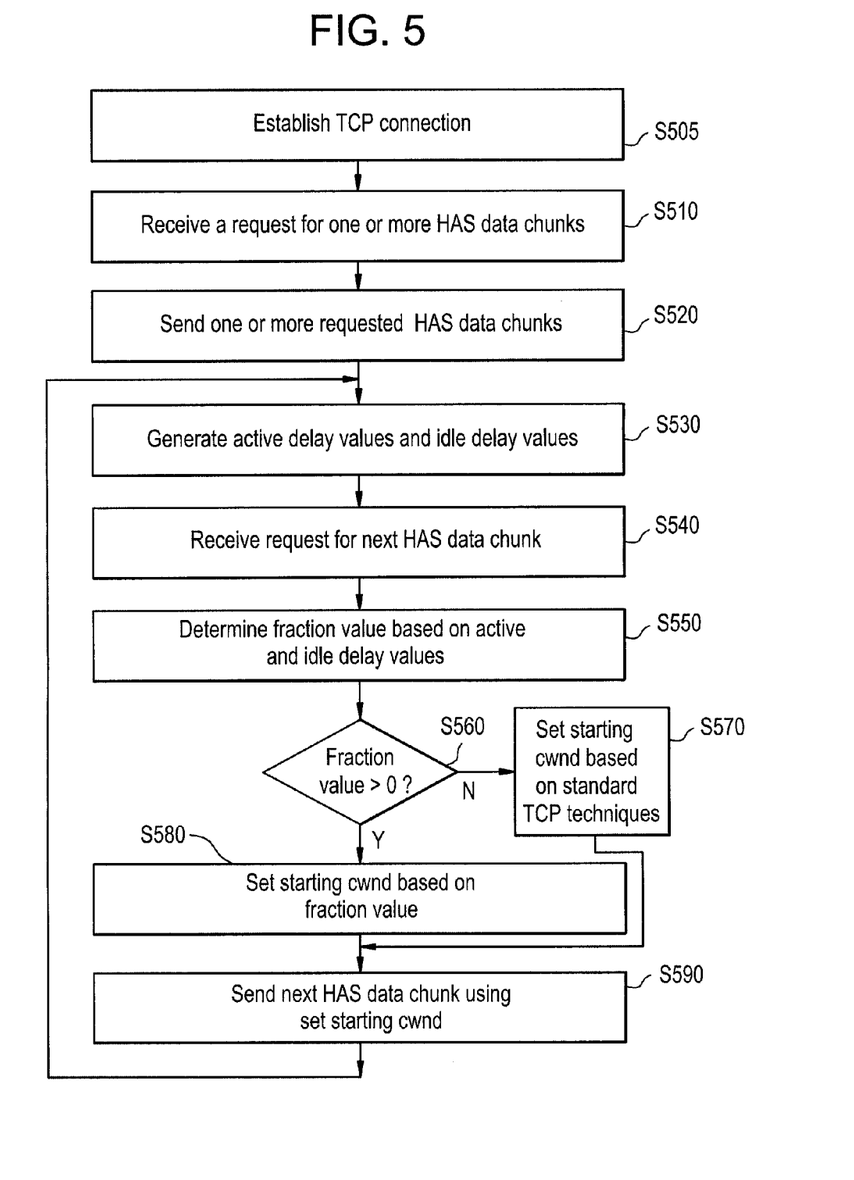
FIG. 5 is a flow diagram illustrating a method for improving HAS performance using TCP modifications at a source according to at least one example embodiment.

Example Method for Improving HAS Performance Using TCP Modifications at a Source FIG. 5 is a flow diagram illustrating a method for improving HAS performance using TCP modifications at a source. FIG. 5 will be discussed with reference to a scenario in which the home router 335 is acting as a HAS client requesting HAS data from the HAS source 305 illustrated in FIG. 3A.

Further, according to at least one example embodiment, each of the operations illustrated in, or described with respect to, FIG. 5 as being performed by the HAS source 305 may be performed by, for example, the network element 351 as illustrated in FIG. 3B. For example, the memory unit 356 may store executable instructions corresponding to each of the operations described below with reference to FIG. 5. Further, the processor unit 358 may be configured perform each of the operations described below with respect to FIG. 5, for example, by executing executable instructions stored in the memory unit 356. Further, according to at least one example embodiment, transmitted data and control signals may be transmitted through the transmitting unit 352, and received data and/or control signals may be received through the receiving unit 354.

In step S505, the HAS source 305 and the home router 335 establish a TCP connection according to well-known TCP procedures including, for example, the three-way handshake.

In step S510, a request for one or more chunks of HAS data is received at the HAS source 305 from the home router 335. As is discussed above, initially, the HAS client may request multiple chunks at the same time in order to fill a buffer at the HAS client.

In step S520, the HAS source sends the one or more HAS data chunks indicated in the request received in step S510.

In step S530, the HAS source 305 generates active delay values and idle delay values. For example, as is discussed above with reference to Table 2, algorithm 1 and algorithm 2, the HAS source 305 may generate the moving average delay values Delay_during_chunk, Delay_during_idle, and Pre-Chunk_delay based delay values measured by the HAS source 305 using RTT calculated from data ACKS and loopback ACKS received at the HAS source 305.

In step S540, the HAS source 305 receives a request for a next HAS data chunk from the home router 335. As is discussed above and illustrated in FIG. 2, some time after an initial plurality of HAS data chunks are sent and a buffer at the HAS client is full, the HAS client may request each new HAS data chunk at a time interval equal or substantially equal to a HAS chunk length.

In step S550, the HAS 305 determines a fraction value based on the active and idle delay values generated in step S530. For example, in accordance with algorithm 2 discussed above, the HAS source 305 may generate the Worst_case_delay_without_loss value and the standard deviation SD-RD-Diff value to use with the delay values Delay_during_chunk, Delay_during_idle, and Pre-Chunk_delay for generating the fraction value 'Fraction'.

In step S560, the HAS source 305 determines whether or not the fraction value is greater than 0. If the fraction value is not greater than 0, the HAS source 305 proceeds to step S570.

In step S570, the HAS source 305 sets a starting cwnd based on standard TCP techniques, for example, the techniques defined in one of IETF publications RFC 2581 and 2861. The HAS source 305 then proceeds to step S590.

Returning to step S560, if the fraction value is greater than 0, the HAS source 305 proceeds to step S580.

In step S580, the HAS source sets a starting cwnd based on the fraction value determined in step S550. For example, as is discussed above with reference to algorithm 2, if the HAS source 305 is running a RFC 2861-based TCP variant, the starting cwnd is set to the product of the cached cwnd and the fraction value. If the HAS source 305 is running a RFC 2581-based TCP variant, the starting cwnd is set to the product of the current ssthresh value and the fraction value. The HAS source 305 then proceeds to step S590.

In step S590, the HAS source 305 sends the next HAS data chunk to the home router 335 using the starting cwnd value determined in either step S570 or S580. The HAS source then returns to step S330 and generates updated active and idle delay values based on active delay values measured during the sending of HAS data chunk in step S590 and idle delay values measured during the idle period after the sending of the HAS data chunk in step S590.

Accordingly, the issues caused by the start-stop nature of HAS data discussed above with reference to FIG. 2 may be addressed by using the TCP modifications discussed above which allow the use of a starting cwnd which is larger than the initial cwnd specified by the traditional slow start algorithm used by, for example TCP Reno, while still limiting the size of the starting cwnd based on the measured expected delay in order to avoid the unfairness associated with a large starting cwnd.

Embodiments of the invention being thus described, it will be obvious that embodiments may be varied in many ways. Such variations are not to be regarded as a departure from the invention, and all such modifications are intended to be included within the scope of the invention.

What is claimed:

1. A method of sending hypertext transfer protocol (HTTP) adaptive streaming (HAS) content from a content source to a client over a transmission control protocol (TCP) connection between the content source and the client, the method comprising:
   measuring network delay values of the TCP connection;
   determining a size of a starting TCP congestion window (cwnd) based on the measured delay values;
   receiving a request for one or more first HAS data chunks from the client;
   sending the one or more first HAS data chunks from the content source to the client over the TCP connection;
   receiving a request for a second HAS data chunk from the client; and
   sending the second HAS chunk from the content source to the client over the TCP connection using the starting cwnd,
   wherein the network delay values include idle delay values indicating an amount of delay in the TCP connection during an idle time period, the idle time period is a time period over which no HAS data chunks are being sent from the content source to the client, and determining the size of the starting cwnd includes setting the size of the starting cwnd based on the idle delay values.

2. The method of claim 1, further comprising:
   generating the idle delay values by,
      generating one or more loopback messages and sending the one or more loop back messages to the HAS client during the idle time period;
      measuring a plurality of first round trip times (RTTs) corresponding to each of the one or more loop back messages, respectively; and
      generating the idle delay values based on the measured plurality of first RTTs.

3. The method of claim 2 wherein the idle delay values include a short term idle delay value, and generating the short term idle delay value includes averaging RTTs falling in a first moving window of the plurality of first RTTs.

4. The method of claim 3 wherein the idle delay values further include a long term delay value, and generating the long term idle delay value includes averaging RTTs falling in a second moving window of the plurality of first RTTs, the first moving window including fewer RTT values than the second moving window.

5. The method of claim 2, further comprising:
   generating an active delay value indicating an amount of delay in the TCP connection during an active time period, the active time period being a time period during which one or more HAS data chunks are being sent,
   wherein setting the size of the starting cwnd includes setting the size of a starting cwnd based on the idle delay values and the active delay value.

6. The method of claim 5,
   wherein sending the one or more first HAS data chunks includes,
      dividing the first one or more data chunks into a plurality of data segments, and sending each of the plurality of data segments to the client; and
wherein generating the active delay value includes,
measuring a plurality of second round trip times (RTTs) corresponding to each of the plurality of data segments, respectively, and
generating the active delay values based on the measured plurality of second RTTs.

7. The method of 6, wherein generating the active delay values based on the measured plurality of second RTTs includes averaging RTTs falling in a moving window of the plurality of second RTTs.

8. The method of 6, further comprising:
storing the n longest successful RTTs from among the plurality of first RTTs and the plurality of second RTTs, successful RTTs being RTTs of data segments or loopback messages for which the content source received no indication of loss; and
determining a lossless delay value based on an average of the n longest successful RTTs,
wherein setting the size of the starting cwnd includes setting the size of a starting cwnd based on the idle delay values, the active delay value, and the lossless delay value.

9. The method of 8, further comprising:
determining a fraction value based on the idle delay values, the active delay value, and the lossless delay value; and
determining whether the fraction value is greater than a reference value,
wherein setting the size of the starting cwnd includes determining a product of the fraction value and a size of a last cwnd used to send the one or more first HAS chunks to the client, and setting the determined product as the size of the starting cwnd.

10. The method of claim 2, wherein the one or more loopback messages are empty MP4 HAS messages.

11. A network apparatus configured to send hypertext transfer protocol (HTTP) adaptive streaming (HAS) content to a client over a transmission control protocol (TCP) connection between the network apparatus and the client, the apparatus comprising:
a receiver unit configured to receive data;
a transmitting unit configured to transmit data;
a memory unit configured to store parameters corresponding with characteristics of the TCP connection; and
a processing unit coupled to the transmitting unit, the receiving unit, and the memory unit and configured to control operations associated with sending HAS content to the client, the operations including,
measuring network delay values of the TCP connection; and
determining a size of a starting TCP congestion window (cwnd) based on the measured delay values,
wherein the processor is further configured to control operations including,
receiving a request for one or more first HAS data chunks from the client;
sending the one or more first HAS data chunks to the client over the TCP connection;
receiving a request for a second HAS data chunk from the client; and
sending the second HAS chunk to the client over the TCP connection using the starting cwnd,
wherein the network delay values include idle delay values indicating an amount of delay in the TCP connection during an idle time period, the idle time period is a time period over which no HAS data chunks are being sent from the content source to the client, and determining the size of the starting cwnd includes setting the size of the starting cwnd based on the idle delay values.

12. The network apparatus of claim 11 wherein the processing unit is configured to generate the idle delay values by,
generating one or more loopback messages and sending the one or more loop back messages to the HAS client during the idle time period;
measuring a plurality of first round trip times (RTTs) corresponding to each of the one or more loop back messages, respectively; and
generating the idle delay values based on the measured plurality of first RTTs.

13. The network apparatus of claim 12 wherein the processor is configured such that the idle delay values include a short idle delay value, and generating the short idle delay value includes averaging Ras falling in a first moving window of the plurality of first RTTs.

14. The network apparatus of claim 13 wherein the processor is configured such that the idle delay values further include a long idle delay value, and generating the long idle delay value includes averaging RTTs falling in a second moving window of the plurality of first RTTs, the first moving window including fewer RTT values than the second moving window.

15. The network apparatus of claim 14, wherein the processor is further configured to control operations including
generating an active delay value indicating an amount of delay in the TCP connection during an active time period, the active time period being a time period during which one or more HAS data chunks are being sent,
wherein setting the size of the starting cwnd includes setting the size of a starting cwnd based on the idle delay values and the active delay value.

16. The network apparatus of claim 15, wherein the processor is configured such that sending the one or more first HAS data chunks includes,
dividing the first one or more data chunks into a plurality of data segments, and
sending each of the plurality of data segments to the client,
wherein generating the active delay value includes,
measuring a plurality of second round trip times (RTTs) corresponding to each of the plurality of data segments, respectively, and
generating the active delay values based on the measured plurality of second RTTs.

17. The network apparatus of 16, wherein the processor is configured such that generating the active delay values based on the measured plurality of second RTTs includes averaging RTTs falling in a moving window of the plurality of second RTTs.

18. The network apparatus of 17, wherein the processor is further configured to control operations including,
storing the n longest successful RTTs from among the plurality of first RTTs and the plurality of second RTTs, successful RTTs being RTTs of data segments or loopback messages for which the content source received no indication of loss; and
determining a lossless delay value based on an average of the n longest successful RTTs,
wherein setting the size of the starting TCP congestion window includes setting the size of a starting TCP congestion window based on the idle delay values, the active delay value, and the lossless delay value.

19. The network apparatus of 18, wherein the processor is further configured to control operations including
- determining a fraction value based on the idle delay values, the active delay value, and the lossless delay value; and
- determining whether the fraction value is greater than a reference value, wherein setting the size of the starting cwnd includes
- determining a product of the fraction value and a size of a last cwnd used to send the one or more first HAS chunks to the client and setting the determined product as the size of the starting cwnd, if the fraction value is greater that the reference value, and
- setting the size of the staring cwnd in accordance with one the TCP standards defined by RFC 2861 and RFC 2581, if the fraction value is not greater that the reference value.

20. The network apparatus of claim 12, wherein the one or more loopback messages are empty MP4 HAS messages.

\* \* \* \* \*